(12) United States Patent
Wu et al.

(10) Patent No.: US 9,562,645 B2
(45) Date of Patent: Feb. 7, 2017

(54) SUSPENSION BRACKET FOR DISPLAY DEVICE

(71) Applicant: BOE TECHNOLOGY GROUP CO., LTD., Beijing (CN)

(72) Inventors: Xiumin Wu, Beijing (CN); Jing Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/800,575

(22) Filed: Jul. 15, 2015

(65) Prior Publication Data

US 2016/0157611 A1 Jun. 9, 2016

(30) Foreign Application Priority Data

Dec. 3, 2014 (CN) .......................... 2014 1 0725322

(51) Int. Cl.
*A47F 5/00* (2006.01)
*F16M 13/02* (2006.01)
*F16M 11/08* (2006.01)

(52) U.S. Cl.
CPC ............ *F16M 13/027* (2013.01); *F16M 11/08* (2013.01)

(58) Field of Classification Search
CPC ............ A47B 97/001; A47B 2097/005; A47B 96/1425; F16M 13/027; F16M 11/08; F16M 13/02; A47F 5/08
USPC ....... 248/289.11, 343, 917–918; 361/679.04; 211/26
See application file for complete search history.

(56) References Cited

U.S. PATENT DOCUMENTS

| 7,077,373 | B1* | 7/2006 | Hoebener | F16M 11/10 248/278.1 |
| 7,267,314 | B1* | 9/2007 | Erickson | F16M 11/04 108/144.11 |
| 7,738,245 | B1* | 6/2010 | Stifal | F16M 11/10 248/917 |
| 2004/0011935 | A1* | 1/2004 | Groesen | F16M 11/04 248/317 |
| 2004/0135050 | A1* | 7/2004 | Lee | F16M 13/027 248/317 |
| 2005/0286028 | A1* | 12/2005 | Challis | F16M 11/14 353/119 |

(Continued)

FOREIGN PATENT DOCUMENTS

CN 201226065 Y 4/2009
CN 201513676 U 6/2010

(Continued)

OTHER PUBLICATIONS

First Chinese Office Action including English translation dated Mar. 29, 2016, for corresponding Chinese Application No. 201410725322.2.

*Primary Examiner* — Christopher E Garft
(74) *Attorney, Agent, or Firm* — Kinney & Lange, P.A.

(57) ABSTRACT

Embodiments of the present disclosure disclose a suspension bracket for a display device, relating to the technical field of a bracket structure. In at least some embodiments, the suspension bracket disclosed is made to solve the problem that the display device has a smaller visual range by being fixed in a fixing manner in the prior art. The suspension bracket comprises a suspension member and a mounting bracket rotatably fixed on the suspension member. The suspension bracket of the present disclosure is configured to hang a display device.

18 Claims, 5 Drawing Sheets

(56) References Cited

U.S. PATENT DOCUMENTS

| | | | | |
|---|---|---|---|---|
| 2006/0118690 A1* | 6/2006 | Cavell | ............... | A47G 25/06 |
| | | | | 248/343 |
| 2008/0011927 A1* | 1/2008 | Park | ............... | F16M 11/12 |
| | | | | 248/324 |
| 2008/0105804 A1* | 5/2008 | Horner | ............... | F16M 13/027 |
| | | | | 248/231.9 |
| 2011/0309041 A1* | 12/2011 | Amadio | ............... | F16M 11/10 |
| | | | | 211/26 |
| 2015/0316202 A1* | 11/2015 | Chouinard | ............... | F16M 13/027 |
| | | | | 248/230.1 |

FOREIGN PATENT DOCUMENTS

| | | |
|---|---|---|
| CN | 202575523 U | 12/2012 |
| CN | 104143290 A | 11/2014 |

\* cited by examiner

SUSPENSION BRACKET FOR DISPLAY DEVICE

CROSS-REFERENCE TO RELATED APPLICATION

This application claims the benefit of Chinese Patent Application No. 201410725322.2 filed on Dec. 3, 2014 in the State Intellectual Property Office of China, the whole disclosure of which is incorporated herein by reference.

BACKGROUND OF THE INVENTION

Field of the Invention

Embodiments of the present disclosure relate to the technical field of a bracket structure, and particularly, to a suspension bracket for a display device.

Description of the Related Art

A display device, as a network display carrier, is widely used in various situations. With development of display device technologies, requirements for convenience of using the display devices become more and more high. For example, the display device is mounted on a bracket. The larger a visual angle of the display device is, the larger a size of a display picture with contrast of more than 10 can be provided for a viewer. The visual angle of a display device means an angle between the line of sight, at which an picture with contrast of more than 10 can be viewed just by the viewer, and a plane perpendicular to a screen. Currently, a display device in public places is generally mounted in a wall hanging or suspending way, that is, the display device is fixed on a wall or a ceiling of a building by means of suspending member(s). The display device displays pictures at fixed angles, which includes a transverse inclination angle and a longitudinal inclination angle.

With the display device mounted in a wall hanging or suspending way in prior art, the display device displays pictures at fixed angles, thus the visual angle of the display device is limited, resulting in that a visual range within which the viewer can view pictures with contrast of more than 10 is smaller.

SUMMARY OF THE INVENTION

Embodiments of the present disclosure provides a suspension bracket for a display device, which is capable of solving the problem that the visual range of the display device is smaller due to fixed mounting of the display device in prior arts.

In order to achieve the above object, embodiments of the present invention provide a suspension bracket for a display device, comprising a suspension member and a mounting bracket rotatably fixed on the suspension member.

According to one embodiment, the mounting bracket has a folded configuration, one folding branch of the folded configuration being in the form of a connecting plate connected with the suspension member, and the other folding branch of the folded configuration being in the form of a mounting plate with a mounting hole. Thereby, the mounting bracket, on which a display device is mounted, can be connected with the suspension member.

According to one embodiment, fixing plates are extended from right and left inner edges of the mounting hole respectively, and the fixing plates are fixedly connected with the display device and are arranged on a side where the connecting plate is located, thereby facilitating mounting operation of the display device.

According to one embodiment, a support plate is extended from a lower inner edge of the mounting hole for supporting the display device, and the support plate is arranged at the same side of the mounting plate as the fixing plates, thereby facilitating to support the display device.

According to one embodiment, the suspension bracket comprises two said mounting brackets having the same configuration and dimension, the connecting plates of the two mounting brackets being fixedly connected with each other, and the mounting plates of the two mounting brackets being fixedly connected with each other, thereby more viewers can view displayed pictures having a higher definition.

According to one embodiment, a strengthening plate is extended from a bottom of the mounting plate of each of the mounting brackets, the connecting plate and the strengthening plate of each of the mounting brackets are provided with abutting plates at a distal end thereof respectively, and the two mounting brackets are fixedly connected with each other via the abutting plates, thereby facilitating interconnection between the two mounting brackets.

According to one embodiment, a folding edge structure is arranged on each of right and left sides of each of the connecting plate, the mounting plate and the strengthening plate, and a cover plate for shielding internal structures are provided on the folding edge structures, thereby enabling the suspension bracket to achieve a function of keeping internal structures thereof secret.

According to one embodiment, the suspension member comprises a fixing shaft, a connecting member fixedly provided at one end of the fixing shaft, a fixing member fixedly provided at the other end of the fixing shaft, and a rotating member fitted over the fixing shaft and provided between the connecting member and the fixing member; wherein the rotating member is fixedly connected with the connecting plate of the mounting bracket.

According to one embodiment, a first damping element is provided between the fixing member and the rotating member and configured to tightly fitted between the fixing member and the rotating member; and a second damping element is provided between the connecting member and the rotating member and configured to tightly fitted between the connecting member and the rotating member, thus the mounting bracket can be rotated about the suspension member within a predetermined angle.

According to one embodiment, both the fixing member and the connecting member are threadedly connected to the fixing shaft.

According to one embodiment, the two mounting brackets are fixedly connected with each other via bolts and/or rivets, in order to achieve a detachable connection between the mounting brackets and to increase a mounting space for the mounting brackets.

With the suspension bracket for a display device according to the embodiments of the present disclosure, the display device is mounted on the mounting bracket, the suspension member is suspended from a ceiling of a building, and the mounting bracket is hung from the suspension member and rotatable about the suspension member. As such, the display device is rotated along with the mounting bracket, thereby providing a large range of visual angle for a viewer.

In the display device mounted in a wall hanging or suspending way in the prior art, the display device displays pictures at fixed angles, thus the visual angle of the display device is limited. Compared to the prior art, with the suspension bracket for a display device according to embodiments of the present disclosure, the display device is rotatable about the suspension member. For the viewer in the same one position, rotation of the display device enables a larger range of visual angle for the viewer, within which the viewer can view displayed pictures having a higher definition.

REFERENCE NUMERALS

01—suspension member, 10—fixing shaft, 11—connecting member, 12—fixing member, 13—rotating member, 14—first damping element, 15—second damping element; 02—mounting bracket, 20—connecting plate, 21—mounting plate, 22—strengthening plate, 23—abutting plate, 24—folding edge structure; 21a—mounting hole, 21b—fixing plate, 21c—support plate.

DETAILED DESCRIPTION OF PREFERRED EMBODIMENTS OF THE INVENTION

Exemplary embodiments of the present invention will be described hereinafter in detail with reference to the attached drawings, wherein the like reference numbers refer to the like elements. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
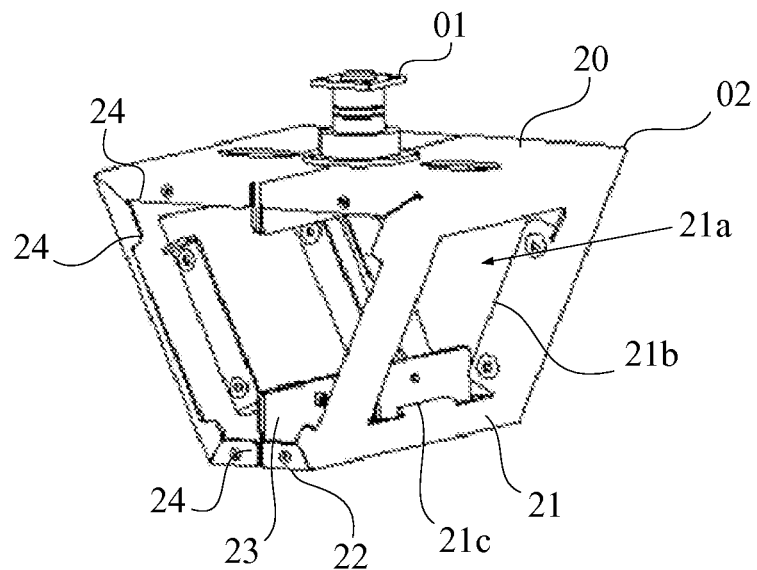
FIG. 1 is a schematic perspective view of a suspension bracket for a display device provided according to an embodiment of the present disclosure.

FIG. 1 shows a suspension bracket for a display device provided according to an embodiment of the present disclosure. With reference to FIG. 1, the suspension bracket for a display device comprises a suspension member 01 and a mounting bracket 02 rotatably fixed on the suspension member 01. Specifically, the mounting bracket 02 may be circumferentially rotated about the suspension member 01 or may be rotated within a predetermined angle.

When the suspension bracket for a display device provided according to the embodiment of the present disclosure is used, the display device is mounted on the mounting bracket, the suspension member is suspended from a ceiling of a building, and the mounting bracket is hung from suspension member and rotatable about the suspension member. As such, the display device is rotated synchronously with the mounting bracket, thereby a larger range of visual angle can be provided for a viewer.

In prior arts, the display device is mounted in a wall hanging or suspending way, and the display device displays pictures at fixed angles, thus the visual angle of the display device is limited. Compared to prior arts, the suspension bracket for a display device according to the embodiment of the present disclosure is provided so that the display device is rotatable about the suspension member. For a viewer in the same one position, rotation of the display device enables a larger range of visual angle for the viewer, within which the viewer can view displayed pictures having a higher definition.

Figure 2:
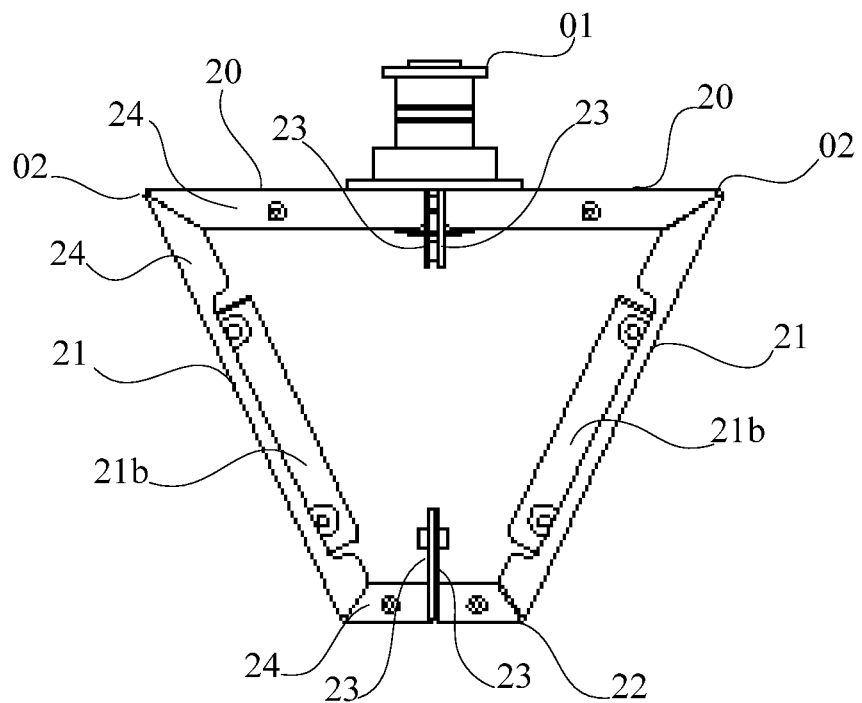
FIG. 2 is a coaxial side view of FIG. 1.

With reference to FIGS. 1 and 2, the mounting bracket 02 has a folded configuration, one folding branch of the folded configuration is in the form of a connecting plate 20. The connecting plate 20 is connected with the suspension member 01. That is, the suspension member 01 is fixedly connected with the mounting bracket 02 via the connecting plate 20 of the mounting bracket 02. The other folding branch of the folded configuration is in the form of a mounting plate 21 with a mounting hole 21a for mounting a display device. According to one embodiment, the folded configuration has a folding angle less than 90 degree, and when the suspension bracket for a display device is hung from the ceiling of the building, the connecting plate is in a horizontal state and a surface of the mounting plate is inclined downwards, so that the display device is mounted on the mounting plate with its display screen being inclined downwards, thereby facilitating the viewer on the ground to view the display screen.

Figure 3:
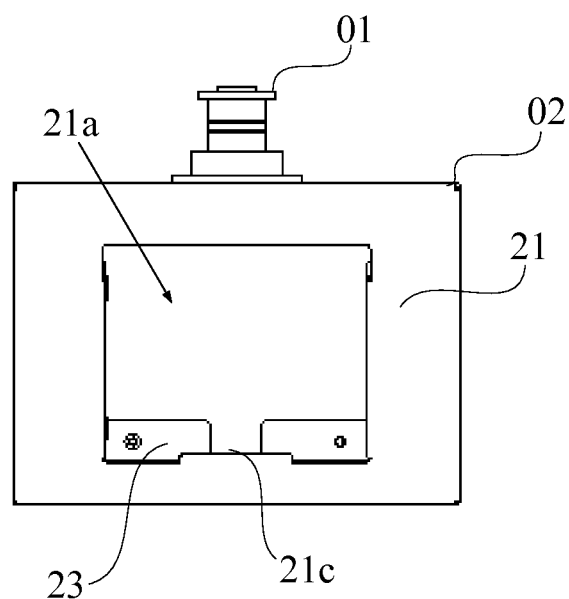
FIG. 3 is a coaxial front view of FIG. 1.

Continued with reference to FIGS. 1 and 3, in this embodiment, the mounting hole 21a is provided as a rectangular hole so as to match with a mounting portion of most of currently used display devices. Fixing plates 21b are extended from right and left inner edges of the mounting hole 21 respectively. The fixing plates 21b are fixedly connected with the display device and arranged on the side of the connecting plate 20. A support plate 21c is extended from a lower inner edge of the mounting hole 21a for supporting the display device, and arranged on the same side of the mounting plate 21 as the fixing plates 21b. The display device is mounted in the mounting hole 21a. The mounting portion of the display device is fixedly connected with the fixing plate 21b at left and right sides thereof, and a bottom end of the display device contacts the support plate 21c, which supports the display device with a supporting force directed in a direction opposite to the gravity direction of the display device, so that the fixed connection between the display device and the fixing plates 21b is reinforced and the connecting elements between the display device and the fixing plates 21b can be prevented from loosening due to the gravity of the display device over a long period of time, or from being bent or broken due to uneven stress distribution. The connecting elements may be a screw, a rivet, a bolt or the like, which may be suitably selected according to different structures of the mounting portions of various display devices and detailed description thereof will be omitted herein.

It is noted that the display devices of various sizes have different mounting portions or mounting positions, and for the above mounting hole, if only the mounting portion of the display device matches with and is compatible with the mounting hole, the mounting hole of one size can be used to mount display devices of different dimensions, and thus improving practicability of the suspension bracket for a display device.

Figure 4:
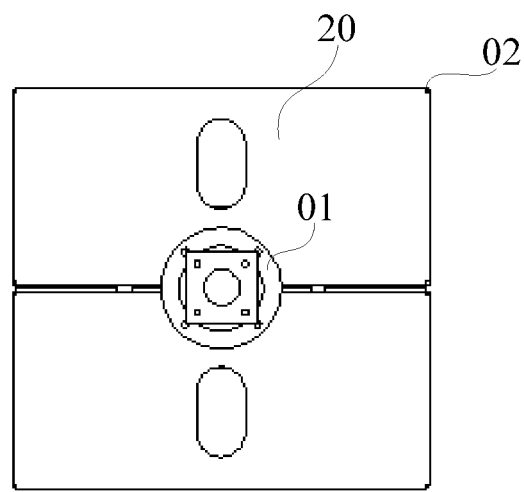
FIG. 4 is a plan view of FIG. 1.

When the suspension bracket for a display device provided according to this embodiment is used in practice, one or two mounting brackets may be hung from one suspension member, so that more viewers can view displayed pictures having a higher definition at the same time. With reference to FIG. 2 and FIG. 4, in this embodiment, the suspension bracket includes two mounting brackets 02 having the same configuration and dimension. Moreover, in order to achieve a fixed connection between the two mounting brackets 02, a strengthening plate 22 is provided and extended from a bottom of the mounting plate 21 of each of the mounting brackets 02, and abutting plates 23 are provided at ends of the connecting plate 20 and the strengthening plate 22 of each of the mounting brackets 02 respectively, so that the two mounting brackets 02 can be fixedly connected with each other via the abutting plates 23. Further, with reference to FIG. 2, in order that the suspension bracket for a display device has a function of keeping internal structures therein secret, a folding edge structure 24 is arranged on each of right and left sides of each of the connecting plate 20, the mounting plate 21 and the strengthening plate 22. In use, a cover plate can be fixed on the folding edge structures 24 so as to shield the internal structures.

Further, the two mounting brackets may be fixedly connected with each other via bolts and/or rivets, in order to achieve a detachable connection between the mounting brackets and to increase a mounting space of the mounting brackets. During assembling, the two mounting brackets may be separated from each other and operated simultaneously by operators, and then the two mounting brackets are abutted on each other and assembled together, thereby improving working efficiency during assembling.

In order that the suspension bracket for a display device has a function of keeping internal structures therein secret, with reference to FIG. 2, a folding edge structure 24 is similarly arranged on each of right and left sides of each of the connecting plate 20, the mounting plate 21 and the strengthening plate 22, and in use, a cover plate may be fixed on the folding edge structures 24 so as to shield the internal structures. Further, the folding edge structures 24 of the connecting plate 20, the mounting plate 21 and the strengthening plate 22 surround a side surface formed by the two mounting brackets 02. As such, a fixed connection between the folding edge structures 24 and the cover plate is more balanced and firmer. In addition, after the suspension bracket for a display device is assembled, the connecting plate is located above the back of the display device. Since wire interfaces of the display device are generally arranged on the back of the display device, in order to provide a more convenient and quicker operation of connecting external wiring harnesses with the wire interfaces of the display device and to make the wiring harnesses more compact, the connecting plate is provided with a through hole through which the external wiring harnesses may pass; in use, the wiring harnesses are provided to pass through the through hole.

Figure 5:
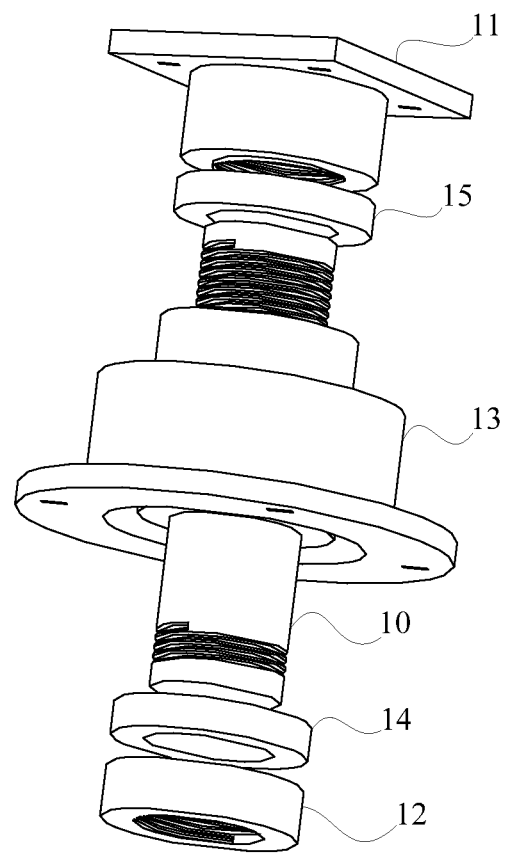
FIG. 5 is a schematic view showing a disassembly state of components of the suspension member of the suspension bracket for a display device provided according to an embodiment of the present disclosure, arranged in an order of assembling.
Figure 6:
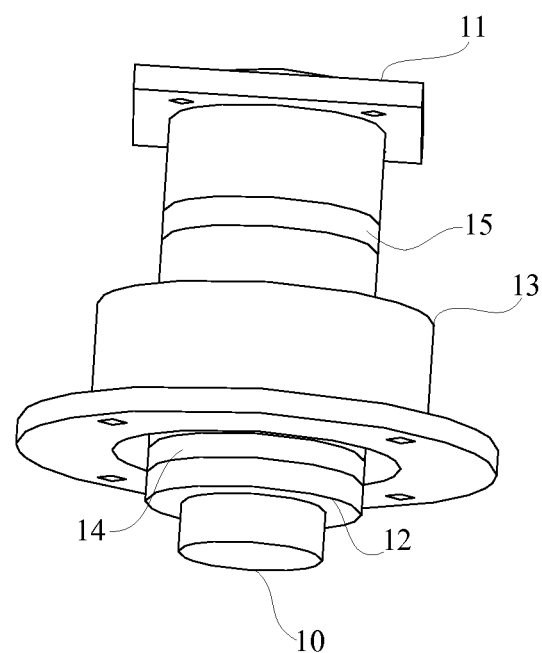
FIG. 6 is a schematic view showing the components in FIG. 5 assembled together.
Figure 7:
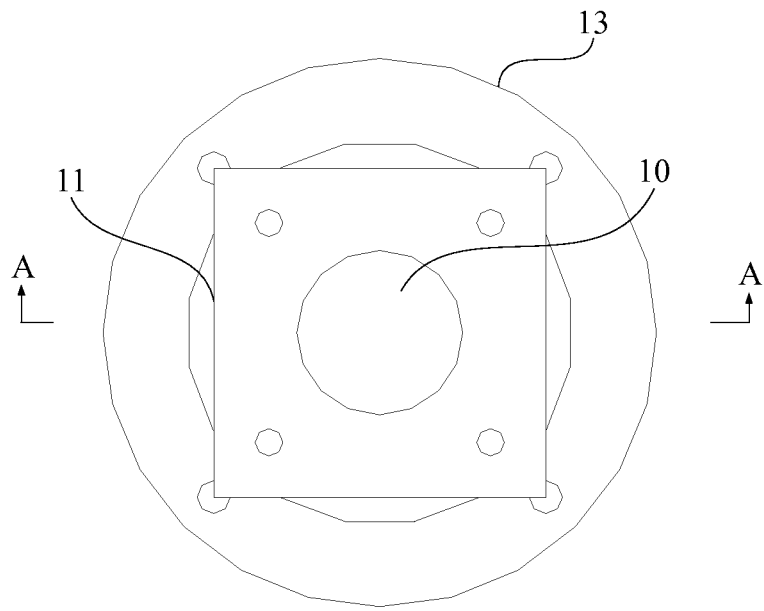
FIG. 7 is a plan view of FIG. 6.
Figure 9:
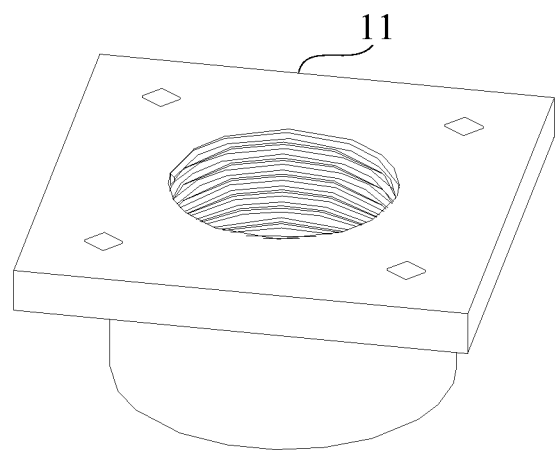
FIG. 9 is a schematic perspective view of a connecting member of the suspension member of the suspension bracket for a display device provided according to an embodiment of the present disclosure.

Hereinafter, the suspension member provided according to an embodiment will be described in detail. With reference to FIG. 5 to FIG. 7, the suspension member 01 of this embodiment includes a fixing shaft 10, a connecting member 11 fixedly provided at one end of the fixing shaft 10, and a fixing member 12 fixedly provided at the other end of the fixing shaft 10. In use, the suspension member 01 is hung from the ceiling of the building via the connecting member 11. With reference to FIG. 9, the connecting member 11 includes a cylindrical portion fixedly fitted over the fixing shaft 10 and a plate portion configured to be mounted on a mounting surface such as the ceiling of the building. For example, the plate portion of the connecting member 11 is provided therein with symmetrical bolt holes, and the connecting member 11 is detachably connected to the ceiling of the building by means of bolts. Further, continued with reference to FIG. 5 to FIG. 7, a rotating member 13 is fitted over the fixing shaft 10 between the connecting member 11 and the fixing member 12. The rotating member 13 is fixedly connected with the connecting plate 20 of the mounting bracket 02. In use, the fixing member 12 is used to prevent the mounting bracket 02 from falling off from the suspension member 01. With this arrangement, the mounting bracket may be rotated about the suspension member by a whole circumference, for example, by means of a driving force provided by an external device, so as to provide the viewers at different angles with displayed pictures of high definition.

Figure 8:
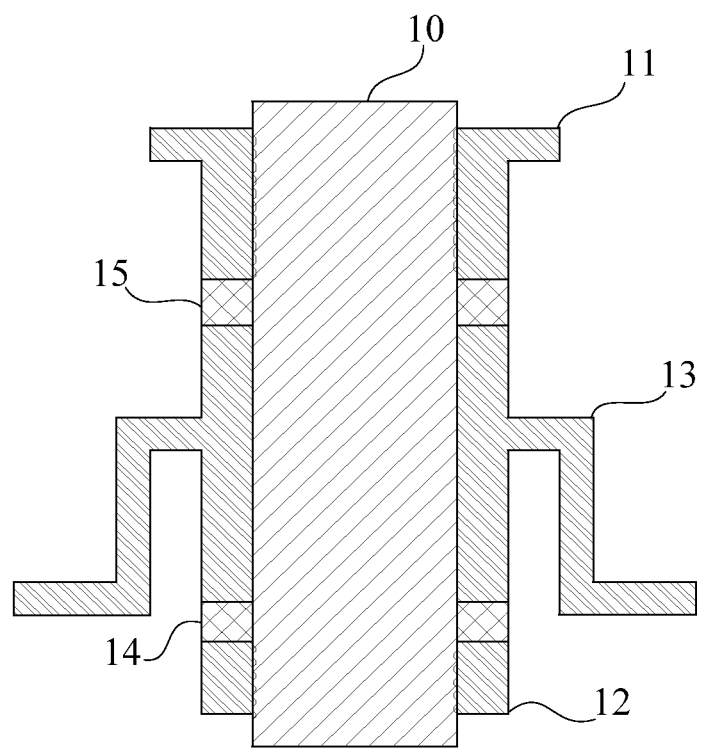
FIG. 8 is a cross sectional view taken along a direction A-A in FIG. 7.

In this embodiment, with reference to FIG. 6 and FIG. 8, in order that the mounting bracket can be rotated about the suspension member within a predetermined angle in a reciprocating way, a first damping element 14 is provided between the fixing member 12 and the rotating member 13 so as to tightly fitted between the fixing member 12 and the rotating member 13; a second damping element 15 is provided between the connecting member 11 and the rotating member 13 so as to tightly fitted between the connecting member 11 and the rotating member 13. In use, the mounting bracket may be rotated by the predetermined angle about the suspension member by means of the driving force provided by an external device, then a friction force provided by the first damping element and second damping element against the rotating member is equal to the driving force provided by the external device so that the mounting bracket stop rotating; the external device provides another driving force opposite to that during the previous rotation movement so as to cause the mounting bracket to be rotated in a direction opposite to the previous rotation movement, and similarly, a friction force provided by the first damping element and second damping element to rotating member is equal to the driving force provided from the external device so that the mounting bracket stop rotating. As such, the display device mounted on the mounting bracket can provide displayed pictures having a higher definition for viewers within a larger visual range.

According to one embodiment, both the fixing member and the connecting member are threadedly connected to the fixing shaft. Use of threaded connection can simplify assembling process, and no additional connecting components are needed, thus reducing weight of the whole suspension bracket, and thus the fixed connection between the connecting member and the ceiling of the building can be made firmer and more reliable so as to improve use security.

Figure 10:
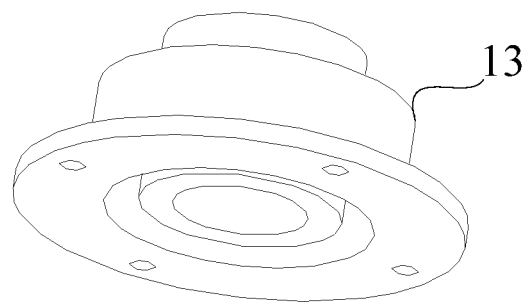
FIG. 10 is a schematic perspective view of a rotating member of the suspension member of the suspension bracket for a display device provided according to an embodiment of the present disclosure.

Further, FIG. 10 shows a rotating member provided according to an embodiment of the present disclosure. With reference to FIGS. 8 and 10, the rotating member 13 comprises an inner cylindrical portion rotatably fitted over the fixing shaft 10, and an outer cylindrical portion having an end face provided with a flange which is fixedly connected with the connecting plate 20. End faces of the inner cylindrical portion contact the first damping element and the second damping element respectively, so that the friction force is provided to stop rotation of the rotating member; the flange of the outer cylindrical portion may be provided therein with symmetrical bolt holes, for being fixedly connected with the connecting plate.

Although several exemplary embodiments of the present disclosure have been shown and described, it would be appreciated by those skilled in the art that various changes or modifications may be made in these embodiments without departing from the principles and spirit of the present invention, the scope of which is defined in the claims and their equivalents.

What is claimed is:

1. A suspension bracket for a display device, comprising a suspension member and a mounting bracket rotatably connected on the suspension member;
   wherein the mounting bracket has a folded configuration, a first folding branch of the folded configuration being in the form of a connecting plate connected with the suspension member, and a second folding branch of the folded configuration being in the form of a mounting plate with a mounting hole;
   wherein the connecting plate and the mounting plate are fixedly connected with each other; and
   wherein fixing plates are extended from right and left inner edges of the mounting hole respectively, the fixing plates being fixedly connectable with the display device and arranged on a side of the mounting plate where the connecting plate is located.

2. The suspension bracket according to claim 1, wherein a support plate is extended from a lower inner edge of the mounting hole to support the display device, and the support plate is arranged on the same side of the mounting plate as the fixing plates.

3. The suspension bracket according to claim 1, wherein the suspension bracket comprises two of the mounting brackets having the same configuration and dimension, the connecting plates of the two mounting brackets being fixedly connected with each other, and the mounting plates of the two mounting brackets being fixedly connected with each other.

4. The suspension bracket according to claim 1, wherein the suspension bracket comprises two of the mounting brackets having the same configuration and dimension, the connecting plates of the two mounting brackets being fixedly connected with each other, and the mounting plates of the two mounting brackets being fixedly connected with each other.

5. The suspension bracket according to claim 2, wherein the suspension bracket comprises two of the mounting brackets having the same configuration and dimension, the connecting plates of the two mounting brackets being fixedly connected with each other, and the mounting plates of the two mounting brackets being fixedly connected with each other.

6. The suspension bracket according to claim 5, wherein
   a strengthening plate is extended from a bottom of the mounting plate of each of the mounting brackets;
   the connecting plate and the strengthening plate of each of the mounting brackets are provided with abutting plates at ends thereof respectively; and
   the two mounting brackets are fixedly connected with each other by the abutting plates between the connecting plates of the two mounting brackets and the abutting plates between the strengthening plates of the two mounting brackets.

7. The suspension bracket according to claim 1, wherein the suspension member comprises:
   a fixing shaft;
   a connecting member fixedly provided at a first end of the fixing shaft;
   a fixing member fixedly provided at a second end of the fixing shaft; and
   a rotating member fitted over the fixing shaft and provided between the connecting member and the fixing member;
   wherein the rotating member is fixedly connected with the connecting plate of the mounting bracket.

8. The suspension bracket according to claim 1, wherein the suspension member comprises:
   a fixing shaft;
   a connecting member fixedly provided at a first end of the fixing shaft;
   a fixing member fixedly provided at a second end of the fixing shaft; and
   a rotating member fitted over the fixing shaft and provided between the connecting member and the fixing member;
   wherein the rotating member is fixedly connected with the connecting plate of the mounting bracket.

9. The suspension bracket according to claim 2, wherein the suspension member comprises:
   a fixing shaft;
   a connecting member fixedly provided at a first end of the fixing shaft;
   a fixing member fixedly provided at a second end of the fixing shaft; and
   a rotating member fitted over the fixing shaft and provided between the connecting member and the fixing member;
   wherein the rotating member is fixedly connected with the connecting plate of the mounting bracket.

10. The suspension bracket according to claim 3, wherein the suspension member comprises:
    a fixing shaft;
    a connecting member fixedly provided at a first end of the fixing shaft;
    a fixing member fixedly provided at a second end of the fixing shaft; and
    a rotating member fitted over the fixing shaft and provided between the connecting member and the fixing member;
    wherein the rotating member is fixedly connected with the connecting plate of the mounting bracket.

11. The suspension bracket according to claim 4, wherein the suspension member comprises:
    a fixing shaft;
    a connecting member fixedly provided at a first end of the fixing shaft;
    a fixing member fixedly provided at a second end of the fixing shaft; and
    a rotating member fitted over the fixing shaft and provided between the connecting member and the fixing member;
    wherein the rotating member is fixedly connected with the connecting plate of the mounting bracket.

12. The suspension bracket according to claim 7, wherein:
    a first damping element is provided between the fixing member and the rotating member and is tightly fitted between the fixing member and the rotating member; and
    a second damping element is provided between the connecting member and the rotating member and is tightly fitted between the connecting member and the rotating member.

13. The suspension bracket according to claim 7, wherein both the fixing member and the connecting member are threadedly connected to the fixing shaft.

14. The suspension bracket according to claim 6, wherein the two mounting brackets are fixedly connected with each other via bolts and/or rivets.

15. The suspension bracket according to claim 6, wherein a folding edge structure is provided on each of right and left sides of each of the connecting plate, the mounting plate and the strengthening plate, and the folding edge structures are provided with a cover plate for shielding internal structures.

16. The suspension bracket according to claim 14, wherein a folding edge structure is provided on each of right and left sides of each of the connecting plate, the mounting plate and the strengthening plate, and the folding edge structures are provided with a cover plate for shielding internal structures.

17. The suspension bracket according to claim 7, wherein the rotating member comprises an inner cylindrical portion and an outer cylindrical portion, the inner cylindrical portion is rotatably fitted over the fixing shaft, and a flange is provided at an end face of the outer cylindrical portion and fixedly connected with the connecting plate of the mounting bracket.

18. The suspension bracket according to claim 7, wherein the connecting member comprises a cylindrical portion fixedly fitted over the fixing shaft and a plate portion configured to be mounted on a mounting surface.

* * * * *